United States Patent
Fujita et al.

(10) Patent No.: US 7,821,773 B2
(45) Date of Patent: Oct. 26, 2010

(54) SOLID ELECTROLYTIC CAPACITOR AND METHOD OF MANUFACTURING THE SAME

(75) Inventors: Masayuki Fujita, Kyoto (JP); Takashi Umemoto, Hirakata (JP); Hiroshi Nonoue, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 12/103,001

(22) Filed: Apr. 15, 2008

(65) Prior Publication Data

US 2008/0266756 A1    Oct. 30, 2008

(30) Foreign Application Priority Data

Apr. 27, 2007    (JP) .............................. 2007-118059

(51) Int. Cl.
  *H01G 9/04*    (2006.01)
  *H01G 9/145*   (2006.01)
  *H01G 9/08*    (2006.01)

(52) U.S. Cl. .................. 361/528; 361/535; 29/25.03

(58) Field of Classification Search ................ 361/523, 361/528–529, 532, 535; 29/25.03
See application file for complete search history.

(56) References Cited

U.S. PATENT DOCUMENTS

| 6,989,289 | B1 * | 1/2006 | Shiraishi et al. | 438/99 |
| 2002/0085335 | A1 * | 7/2002 | Nakamura | 361/302 |
| 2002/0159223 | A1 * | 10/2002 | Mido et al. | 361/523 |
| 2004/0134874 | A1 * | 7/2004 | Hossick-Schott et al. | 216/13 |

FOREIGN PATENT DOCUMENTS

| JP | 02137311 A * | 5/1990 |
| JP | HEI7-94363 A | 4/1995 |
| JP | HEI8-31700 A | 2/1996 |
| JP | 10-106897 A1 | 4/1998 |
| JP | 3104456 B2 | 9/2000 |
| JP | 2002-237431 A1 | 8/2002 |
| JP | 2004-014667 A1 | 1/2004 |

* cited by examiner

*Primary Examiner*—Eric Thomas
(74) *Attorney, Agent, or Firm*—Marvin A. Motsenbocker; Mots Law, PLLC

(57) ABSTRACT

Particles of a valve metal and a binder are mixed and kneaded together. The mixed-kneaded matter obtained thereby is molded, and a through-hole is formed in the molded body. An anode body is formed by sintering the molded body. A dielectric layer is formed on the surface of the anode body thus formed. Subsequently, an conducting polymer layer is formed on the dielectric layer.

14 Claims, 3 Drawing Sheets

SOLID ELECTROLYTIC CAPACITOR AND METHOD OF MANUFACTURING THE SAME

CROSS REFERENCE TO RELATED APPLICATIONS

This application claims priority based on 35 USC 119 from prior Japanese Patent Application No. P2007-118059 filed on Apr. 27, 2007, the entire contents of which are incorporated herein by reference.

BACKGROUND OF THE INVENTION

1. Field of the Invention

The present invention relates to more reliable solid electrolytic capacitor with a larger capacitance, and a method of manufacturing the same.

2. Description of Related Art

Solid electrolytic capacitors exhibit good high-frequency characteristics, and have large capacities although small in size. For this reason, solid electrolytic capacitors are widely used for power supply circuits in various electronic appliances including personal computers and imaging devices. In addition, the emergence of higher-performance mobile appliances typified by cellular phones and portable music players demands smaller-sized capacitors with higher capacitances.

FIG. 5A is a cross-sectional view of a conventional solid electrolytic capacitor. FIG. 5B is a cross-sectional view of the solid electrolytic capacitor taken along line B-B of FIG. 5A. FIG. 5C is a cross-sectional view of the solid electrolytic capacitor taken along line C-C of FIG. 5A. As shown in FIGS. 5A to 5C, anode body 3, dielectric layer 4, and conducting polymer layer 5 are formed around anode lead 2. Surrounding anode lead 2, anode body 3 is formed by sintering particles of a valve metal such as tantalum, niobium, titanium and aluminum into a cuboid shape.

Dielectric layer 4 is formed on the respective surfaces of anode body 3 and anode lead 2. Dielectric layer 4 is formed by oxidizing the respective surfaces of anode body 3 and anode lead 2, for example, by anodization. Conducting polymer layer 5 made of a conducting polymer such as polypyrrole and polyaniline is formed on the dielectric layer 4 and in spaces in a way that the spaces are embedded with conducting polymer layer 5.

Carbon layer 6 and silver layer 7 are formed on the top surface of conducting polymer layer 5. Anode terminal 1, which is plate-shaped, is connected to anode lead 2, whereas cathode terminal 8, which is plate-shaped, is connected to silver layer 7.

Outer package 9 is formed in a cuboid shape in order to accommodate anode lead 2, anode body 3, dielectric layer 4, conducting polymer layer 5, carbon layer 6 and silver layer 7. Outer package 9 is formed, for example, from an epoxy resin. Anode terminal 1 and cathode terminal 8 are drawn out of the outer package 9, and extend in mutually different directions, and are bent downwards. Extremity portions respectively of these terminals are arranged along the bottom surface of outer package 9, and are used to electrically connect the solid electrolytic capacitor to a mount substrate. A solid electrolytic capacitor with this configuration is disclosed, for example, in Japanese Patent Application Laid-Open Publication No. 2004-14667.

In making a solid electrolytic capacitor with a larger capacitance, the surface area of a sintered body is increased, which is used as the anode body, and which is obtained by sintering metal particles made of a valve metal or its alloy around the anode lead. A method of increasing the surface area of the sintered body includes increasing the particle density by reducing the size of metal particles used for sintering.

SUMMARY OF THE INVENTION

The reduction of metal particles size used for sintering provides an increase in capacitance to some extent. However, the reduction brings about a problem that the rate of increase in capacitance diminishes as the surface area increases. The inventors have made a close examination of the cause of this problem, and find that, when metal particles used for sintering are smaller in size, the conducting polymer layer does not fully form inside the anode body, and the inside of the anode body is not fully employed as a capacitor.

An aspect of the invention provides a solid electrolytic capacitor that comprises: an anode body including a porous body; a dielectric layer formed on the anode body; and a conducting polymer layer formed on the dielectric layer; wherein the anode body includes at least one hole which penetrates the anode body from its first surface to its second surface, which is different from the first surface.

This configuration allows the supply of a sufficient amount of monomer for the conducting polymer to the inside of the anode body through the hole portion formed in the anode body, and thus to fully form the conducting polymer layer even inside the anode body. In addition, the penetration of the hole portion through the anode body up to the opposite surface enables the fluid including the monomer for the conducting polymer to flow without stagnation. Accordingly, it becomes possible to smoothly supply monomer of the conducting polymer to the inside of the anode body, and thus to facilitate forming the conducting polymer layer inside the anode body.

In this respect, desirably the solid electrolytic capacitor should comprise an outer package that covers at least a part of the conducting polymer layer, the solid electrolytic capacitor wherein a part of the outer package enters the inside of the hole portion.

The entry of part of the outer package into the hole interior portion increases the contact area between the anode body and the outer package, and accordingly enhances the adhesion properties. This makes failures less likely. Examples of these failures include: separation of outer package from the anode body and the deformation of outer package due to mechanical impact force from the outside of the solid electrolytic capacitor; and consequent delamination of the silver layer, the carbon layer and the conducting polymer layer. In addition, when one part of the outer package connects to another part of the outer package with the hole penetrating the anode body, the connection checks the outer package from being separated from the anode body, and from being deformed.

Another aspect of the present invention provides a method of manufacturing a solid electrolytic capacitor, which comprises: forming an anode body, the anode body forming step comprising mixing and kneading particles of a valve metal and a binder together, molding the mixed-kneaded matter obtained by the mixing and kneading, forming a through-hole in the molded body obtained by molding, and forming an anode body by sintering the molded body; forming a dielectric layer on the surface of the anode body; and forming a conducting polymer layer on the dielectric layer.

The foregoing method allows simple formation of the through-hole in the anode body.

The present invention can provide a solid electrolytic capacitor having a larger capacitance that is obtained as a result of checking capacitance reduction that would otherwise occur due to a process of forming a conducting layer.

DETAILED DESCRIPTION OF EMBODIMENTS

Figure 1A:
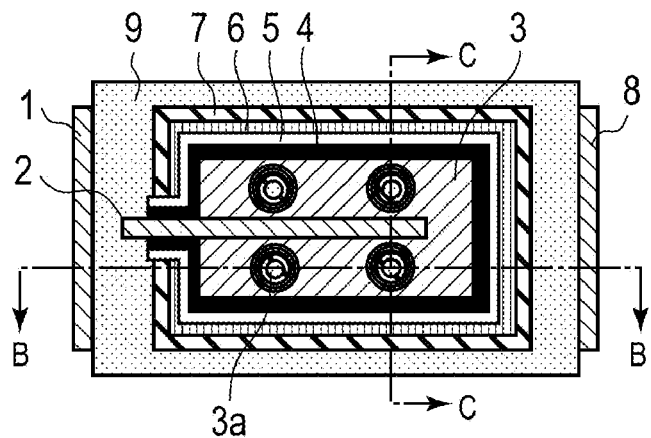
FIG. 1A is a cross-sectional view of a solid electrolytic capacitor according to a first embodiment.

Embodiments of the present invention will be described by referring to the drawings. In the description of the drawings of the embodiments, same or similar reference numerals may be given to denote the same or similar portions.

Prepositions, such as "on", "over" and "above" may be defined with respect to a surface, for example a layer surface, regardless of that surface's orientation in space. Preposition "above" may be used in the specification and claims even if a layer is in contact with another layer. Preposition "on" may be used in the specification and claims when a layer is not in contact with another layer, for example, there is an intervening layer between them.

First Embodiment

Figure 1C:
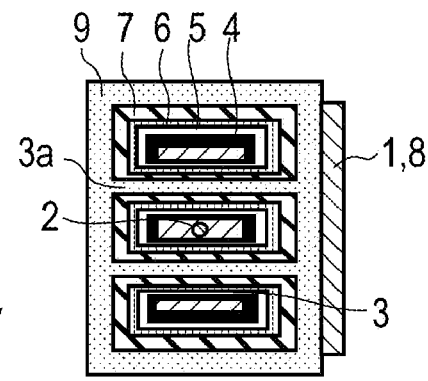
FIG. 1C is a cross-sectional view of the solid electrolytic capacitor taken along line C-C of FIG. 1A.
Figure 1B:
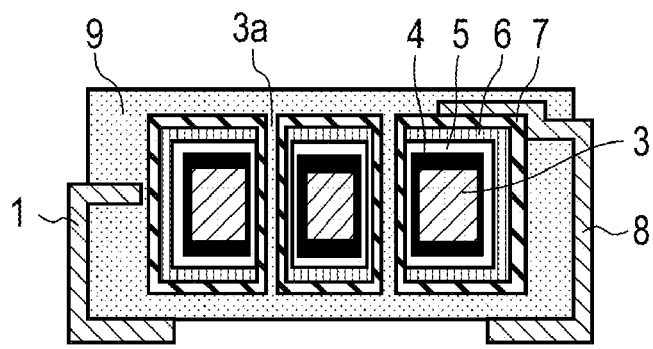
FIG. 1B is a cross-sectional view of the solid electrolytic capacitor taken along line B-B of FIG. 1A.

FIG. 1A is a cross-sectional view of a solid electrolytic capacitor according to a first embodiment. FIG. 1B is a cross-sectional view of the solid electrolytic capacitor taken along the line B-B of FIG. 1A. FIG. 1C is a cross-sectional view of the solid electrolytic capacitor taken along the line C-C of FIG. 1A. Descriptions will be provided hereinbelow for the structure of the solid electrolytic capacitor according to the first embodiment.

In the solid electrolytic capacitor according to this embodiment, as shown in FIG. 1, anode lead 2 is embedded in anode body 3. Anode lead 2 is made of a valve metal. Anode body 3 is formed in a cuboid shape by molding particles of a valve metal into the cuboid shape, and subsequently by sintering the resultant mold in vacuum.

Figure 2:
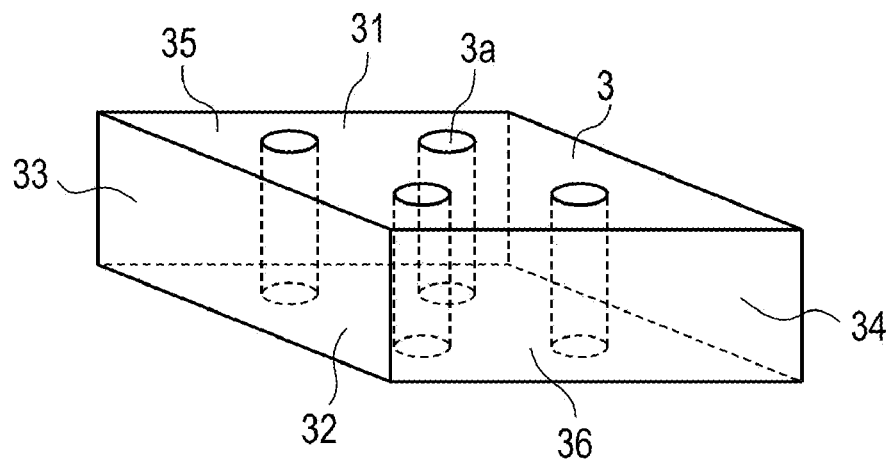
FIG. 2 is a perspective view of an anode body in the solid electrolytic capacitor according to the first embodiment.

FIG. 2 is a perspective view of the anode body in the solid electrolytic capacitor according to the present embodiment. As shown in FIG. 2, anode body 3 includes multiple hole portions 3a, which penetrate anode body 3 from surface 31 constituting cuboid-shaped anode body 3 to surface 32 constituting cuboid-shaped anode body 3, in the respective locations which do not cross anode lead 2. Surface 32 is opposed to surface 31.

In this respect, the surfaces in which respective openings of hole portions 3a are made are not limited to a set of first surface 31 and second surface 32 between which hole portions 3a penetrate anode body 3. The surfaces may be a set of third surface 33 and fourth surface 34 between which hole portions 3a penetrate anode body 3, or a set of fifth surface 35 to 6th surface 36 between which hole portions 3a penetrate anode body 3. Furthermore, the surfaces may be mutually unopposed, such as a set of surface 31 to surface 33, between which hole portions 3a penetrate anode body 3.

In addition, even when anode body 3 is shaped like any other form other than the cuboid, it suffices that anode body 3 has hole portions 3a penetrating anode body 3 from one surface to another, which constitute the form.

The respective opening sizes of hole portions 3a suffice if the openings are large enough to prevent the opening closure with conducting polymer layer 5 before conducting polymer layer 5 is formed inside the anode body 3. Desirably the opening sizes should be, for example, more than 100 times as large as the size of interstices among metal particles that constitute anode body 3. For example, when the respective openings of hole portions 3a are circular, the openings may be set at 0.1 mm to 1 mm in diameter. When the diameter of the openings is smaller than 0.1 mm, the openings likely may be closed with conducting polymer layer 5 before conducting polymer layer 5 is formed inside each of hole portions 3a, and that passages through which the monomer is supplied to the inside of anode body 3 may be accordingly blocked there. When the diameter of the openings becomes larger than 1 mm, the surface area of the anode body decreases, and it is accordingly likely that the capacitance may decrease. Particularly to obtain a higher capacitance, it is desirable that the diameter of the openings should be 0.3 mm to 0.7 mm.

Note that the valve metal constituting anode lead 2 and anode body 3 is a metal material that can form an insulating oxide film. Titanium, tantalum, aluminum, niobium, hafnium, zirconium, zinc, tungsten, bismuth, antimony and the like can be used as the valve metal. Anode body 3 can include a porous sintered body when particles of any one of these metals are sintered. It is desirable that one of tantalum, aluminum and niobium should be used as the material for anode lead 2 and anode body 3, because the three metals make the dielectric constant of its oxide higher and are more easily available as the material. In particular, it is desirable that niobium should be used as the material, because the dielectric constant of its oxide is approximately 1.5 times as large as that of a tantalum oxide.

In addition, an alloy of the afore-mentioned valve metals may be used as the valve metal constituting anode lead 2 and anode body 3. An alloy of any one of the afore-mentioned valve metals and any other metal can be used as well. In this case, it is desirable that the proportion of a valve metal in the alloy should be not less than 50%.

Figure 3A:
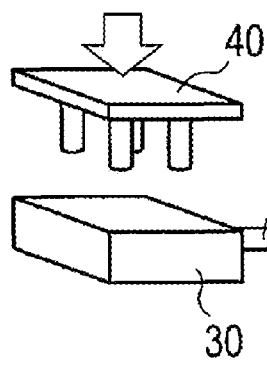
FIG. 3A is a diagram A showing a step of manufacturing the anode body in the solid electrolytic capacitor according to the first embodiment.
Figure 3B:
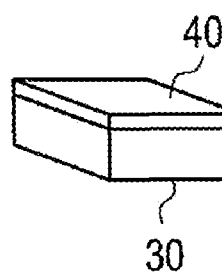
FIG. 3B is a diagram B showing a subsequent step of manufacturing the anode body in the solid electrolytic capacitor.
Figure 3C:
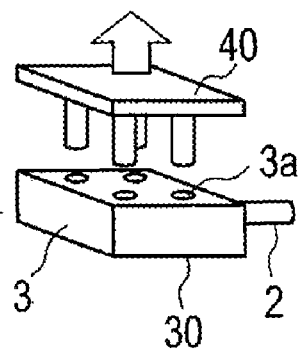
FIG. 3C is a diagram C showing an ensuing step of manufacturing the solid electrolytic capacitor.

FIG. 3A is a diagram A showing a step of manufacturing the anode body of the solid electrolytic capacitor according to the first embodiment. FIG. 3B is a diagram B showing a subsequent step of manufacturing the anode body of the solid electrolytic capacitor. FIG. 3C is a diagram C showing an ensuing step of manufacturing the anode body of the solid electrolytic capacitor. Descriptions will be provided hereinbelow for the manufacturing steps by seeing these drawings. First, metal particles of a valve metal is mixed with a binder. The metal particles and the binder are kneaded fully. Subsequently, anode lead 2 is inserted in the kneaded body of the metal particles and the binder. Then, anode lead 2 and the kneaded body are inserted in a mold together, and are formed into a particular shape. Thereby, molded body 30 is formed.

Thereafter, piercing jig 40 or the like, which has multiple bar-shaped protrusions as shown in FIG. 3A is applied to molded body 30. By this, the bar-shaped protrusions of the piercing jig 40 are inserted in molded body 30, as shown in FIG. 3B. Subsequently, as shown in FIG. 3C, through-holes are formed by detaching the piercing jig 40 from molded body 30. Under reduced pressure, the binder is removed from the kneaded-metal-particles molded body in which the through-holes have been made. The metal particles in the kneaded-metal-particles molded body are sintered at high temperature. Thereby, anode body 3 is formed.

In this respect, metal particles, which are 0.08 μm to 1 μm in particle size, can be used. In a case where the particle size becomes smaller than 0.08 μm, the metal particles are packed together, and a space in which the cathode film can be formed is accordingly limited. This makes it likely that the proportion of cathode coating may decrease, and that the capacity utilization of the capacitance may accordingly reduce. When the particle size becomes larger than 1 μm, the number of particles decreases. This makes it likely that the surface area may decrease, and that the capacitance may accordingly reduce. Particularly to obtain a higher capacitance, it is desirable that the metal particles should be 0.2 μm to 0.5 μm in particle size.

Furthermore, polyvinyl alcohol (PVA), polyvinyl butyral, polyvinyl acetate, and a mixture of an acrylic resin and an organic solvent can be used as the binder, which is mixed with the metal particles. It is desirable that the sintering temperature should be 900° C. to 1300° C. In a case where the sintering temperature is lower than 900° C., it is likely that the metal particles may be sintered insufficiently. In a case where the sintering temperature is higher than 1300° C., the metal particles are sintered too much, and holes decrease in number. This makes it likely that the surface area may decrease.

Dielectric layer 4 made of an oxide of a valve action material is formed on the respective surfaces of anode lead 2 and anode body 3. In a case where, for example, the valve metal is a niobium metal, dielectric layer 4 is made of niobium oxide.

Dielectric layer 4 is formed through anodization of anode lead 2 and anode body 3 in an aqueous solution such as an aqueous solution containing a phosphoric acid. Dielectric layer 4 is formed on the surface of the valve metal inside each of the multiple holes in the anode body as well. Desirably the film thickness of dielectric layer 4 should be in a range of 10 nm to 500 nm. When the film thickness of dielectric layer 4 is larger than 500 nm, it is likely that the electrostatic capacitance may decrease, and that troubles such as separation of dielectric layer 4 from anode lead 2 and anode body 3 may be easy to take place. By contrast, in a case where the film thickness of dielectric layer 4 is smaller than 10 nm, it is likely that the breakdown voltage may decrease, and that the leakage current may increase.

Conducting polymer layer 5 made of polypyrrole or the like is formed on dielectric layer 5. No specific restriction is imposed on the material for conducting polymer layer 5 as long as a conducting polymer is used as the material. Particularly polypyrrole, polyaniline, polythiophene or the like can be used as the material, because these exhibit a better electric conductivity.

Conducting polymer layer 5 can be formed by chemical polymerization or the like. During the chemical polymerization, conducting polymer layer 5 forms through oxidative polymerization of monomer by an oxidant. To put it in detail, dielectric layer 4 forms on the respective surfaces of anode body 3 and anode lead 2, and an oxidant thereafter adheres onto dielectric layer 4. Subsequently, anode body 3 and anode lead 2 to which the oxidant is adhered are steeped in a solution in which the monomer is dissolved, or are left in an atmosphere that evaporates monomer. In this manner, the monomer is polymerized on dielectric layer 5, and conducting polymer layer 5 is thus formed.

For this reason, as conducting polymer layer 5 increasingly forms on dielectric layer 4 near the surface of anode body 3, spaces among the metal particles near the surface of anode body 3 become embedded with conducting polymer layer 5. This makes it increasingly difficult to supply sufficient monomer to the inside of the anode body. As a result, areas devoid of conducting polymer layer 5 forms inside the anode body, or areas of too thin conducting polymer layers 5 form and insufficiently function as the capacitor inside the anode body.

With this taken into consideration, anode body 3 according to the present invention is designed to have hole portions 3a that penetrate anode body 3 from one surface to an opposed surface constituting anode body 3. For this reason, the monomer of which to form conducting polymer layer 5 is sufficiently supplied to the inside of anode body 3 through hole portions 3a. As a result, even if hole portions 3a are closed with conducting polymer layer 5 near the surface of the anode body 3, conducting polymer layer 5 can form inside the anode body. Consequently, this increases an area where conducting polymer layer 5 is capable of being formed in anode body 3 as a whole, and accordingly allows a larger capacitance in the solid electrolytic capacitor.

After conducting polymer layer 5 is formed, carbon layer 6 is formed of a layer containing carbon particles by applying a carbon paste onto the conducting polymer layer 5, and subsequently by drying the carbon paste. Thereafter, silver layer 7 is formed of a layer containing silver particles by applying a silver paste onto carbon layer 7, and subsequently by drying the silver paste.

Cathode terminal 8, which is plate-shaped, is connected onto silver layer 7 with an conducting adhesive in between. Anode terminal 1, which is plate-shaped, is connected to anode lead 2 by spot welding. The widening of the widths respectively of anode terminal 1 and cathode terminal 8 almost up to the width of the anode body 3 makes it possible to reduce resistance loss in the corresponding terminal portions. Subsequently, outer package 9 made of an epoxy resin or the like is formed by injection molding or the like in a way that a part of each of anode terminal 1 and cathode terminal 8 is drawn out of outer package 9 as shown in FIG. 1.

At this time, the epoxy resin or the like of which outer package 9 is formed enters hole portions 3a in anode body 3, and hardens there. This increases the contact area between outer package 9 and each of conducting polymer layer 5, carbon layer 6 and silver layer 7. The increased contact area accordingly enhances the adhesion between outer package 9 and each of conducting polymer layer 5, carbon layer 6 and silver layer 7. The enhanced adhesion checks the occurrence of failures such as the deformation of outer package 9 due to an impact coming from the outside of outer package 9, and a consequent delamination of conducting polymer layer 5 and the like. In addition, when a part of outer packages 9 are connected to another part thereof inside each of hole portions 3a which penetrate anode body 3, this connection further enhances the adhesion. This further enhanced adhesion makes it possible to further reduce the incidence rate of failures.

It should be noted that an conducting material such as nickel can be used as the material for anode terminal 1 and cathode terminal 8. Extremities of anode terminal 1 and cathode terminal 8 are exposed to the outside of outer package 9 and are folded. These function as the terminals of the solid electrolytic capacitor.

The present embodiment provides a solid electrolytic capacitor having a structure that checks the conducting polymer layer formed near the surface of the anode body from hindering the supply of the monomer for the conducting polymer to the inside of the anode body, and the method of manufacturing the solid electrolytic capacitor. Thereby, the present embodiment allows sufficient formation of the conducting polymer layer inside the anode body.

Second Embodiment

Figure 4:
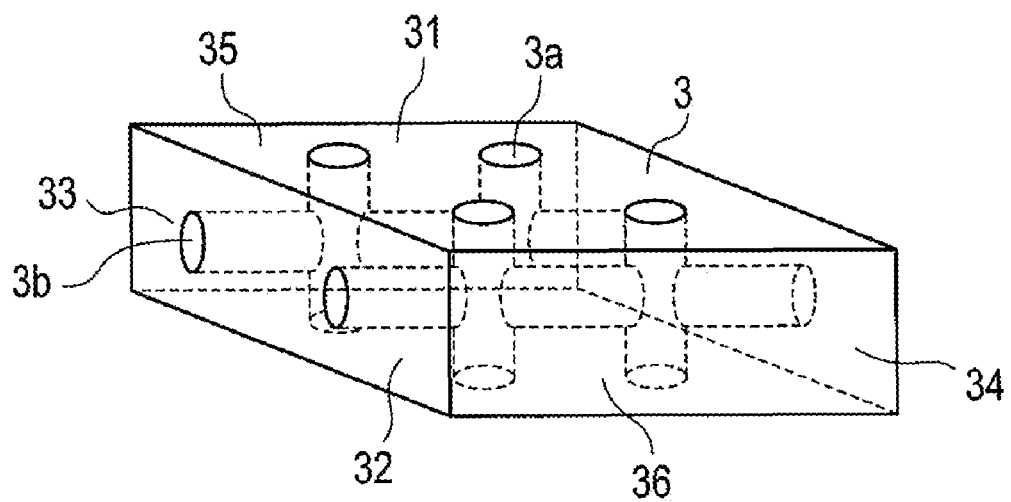
FIG. 4 is a perspective view of an anode body in a solid electrolytic capacitor according to a second embodiment.
Figure 5A:
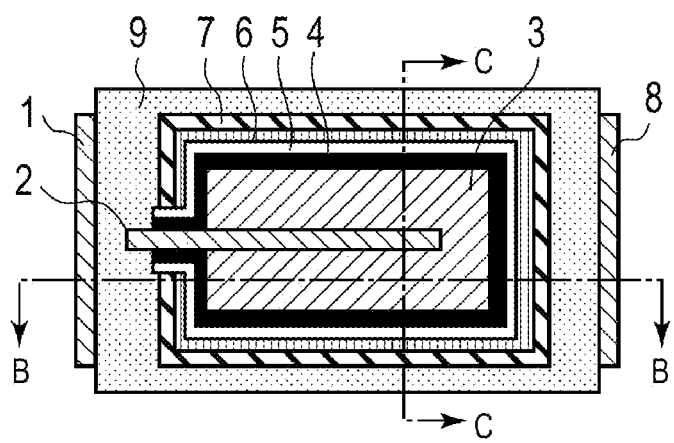
FIG. 5A is a cross-sectional view of a conventional type of solid electrolytic capacitor.
Figure 5C:
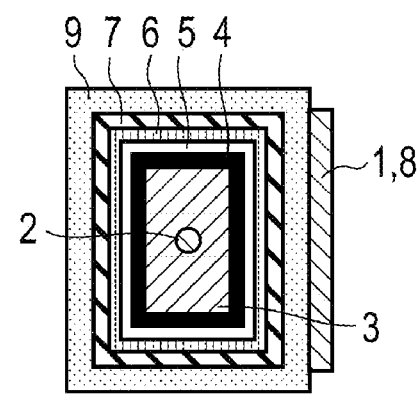
FIG. 5C is a cross-sectional view of the conventional type of solid electrolytic capacitor taken along the line C-C of FIG. 5A.
Figure 5B:
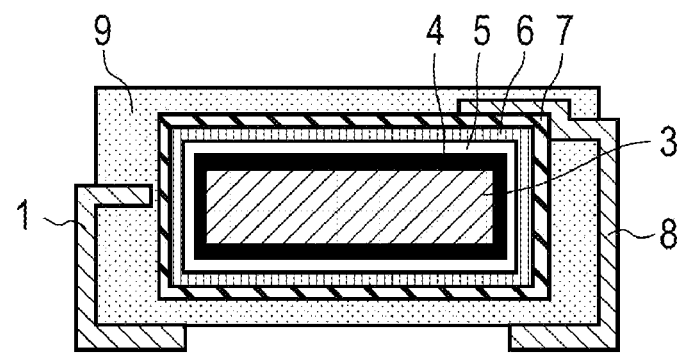
FIG. 5B is a cross-sectional view of the conventional type of solid electrolytic capacitor taken along the line B-B of FIG. 5A.

FIG. 4 is a perspective view of an anode body in a solid electrolytic capacitor according to a second embodiment. As shown in FIG. 4, anode body 3 includes multiple hole portions 3a that penetrate anode body 3 from first surface 31 to second surface 32, which is opposed to first surface 31, and hole portions 3b that penetrate anode body 3 from third surface 33 to fourth surface 34, which is opposed to third surfaces 33. Hole portions 3a are connected to hole portions 3b inside anode body 3. By use of anode body 3 thus formed, the solid electrolytic capacitor according to the second embodiment can form by including the same configuration as constructed in the first embodiment.

In this respect, the openings of hole portions 3a and 3b may each form in any surface as in the first embodiment.

The solid electrolytic capacitor according to the present embodiment can secure more paths for supplying monomer for conducting polymer layer 5 to the inside of anode body 3, because the solid electrolytic capacitor has through-holes that penetrate anode body 3 from the multiple surfaces to their opposed counterpart surfaces. This provides a solid electrolytic capacitor according to the second embodiment having a far larger capacitance than the solid electrolytic capacitor according to the first embodiment.

Example 1

As the material for anode body 3, niobium powder having a CV value of 100,000 [μF·V/g] is used, where the CV value represents the product of capacitance and electrolytic voltage of a niobium sintered body on which an electrolytic oxidation film have been formed. The niobium powder and the binder are mixed and kneaded together, and mixed-kneaded niobium powder is thus prepared. Along with a metal wire made of tantalum with a diameter of 0.5 mm that later serves as anode lead 2, the niobium powder mixed and kneaded with the binder is formed into a shape with a size of 4.5 mm×3.3 mm×1.0 mm by use of the mold. (Four) holes (with 0.5 mmf) which penetrated the niobium-powder molded body are opened in the niobium-powder molded body by use of the piercing jig, as shown in FIG. 3. Subsequently, the binder is removed from the resultant niobium-powder molded body under a reduced pressure. The resultant niobium-powder molded body is sintered at 1100° C. As a result, anode body 3 made of niobium is formed.

The oxide film on the surface of anode body 3 thus formed is porous, and is made of niobium by anodization. This oxide film is used as dielectric layer 4. More specifically, dielectric layer 4 is formed by steeping anode body 3 made of niobium in an aqueous solution containing approximately 0.1% by weight phosphoric acid, which is kept at approximately 60° C., and subsequently by applying a voltage of approximately 10V to the anode body 3 thus steeped for 10 hours. After dielectric layer 4 forms, the capacitance of anode body 3 made of niobium immersed in water is measured to obtain the electrostatic capacitance of anode body 3 irrespective of how the conducting polymer layer is formed.

It should be noted that the capacitance of anode body 3 made of niobium immersed in water is measured by steeping anode body 3 and its counter electrode in an solution containing 30% by weight of sulfuric acid in accordance with a method of measuring an electrostatic capacitance described in Standards of Electronic Industries Association of Japan (EIAJ RC-2361A).

Subsequently, a pyrrole which is a monomer of polypyrrole is adhered onto dielectric layer 4 to form polypyrrole, which is a conducting polymer, on dielectric layer 4 formed on the surface of anode body 3, which is porous, and which is made of niobium. Thereafter, as conducting polymer layer 5, the polypyrrole film is formed of the pyrrole through chemical polymerization or the like. After that, carbon layer 6 and silver layer 7 are formed on the polypyrrole film. Thereby, a capacitor element is formed. Anode terminal 1 and cathode terminal 8 are respectively attached to anode lead 2 and silver layer 7 of this capacitor element. Subsequently, the capacitor element and a metal terminal block are covered with a resin by injection molding, and outer package 9 is thus formed. Thereby, the solid electrolytic capacitor according to example 1 is completed.

100 solid electrolytic capacitors are manufactured at the same time. The capacitance of each of the 100 solid electrolytic capacitors is measured at a frequency of 120 Hz with an LCR meter. An average capacitance is obtained from the result of the measurement.

Example 2

As the material for anode body 3, niobium powder having a CV value of 100,000 [μF·V/g] is used, where the CV value represents the product of capacitance and electrolytic voltage of a niobium sintered body on which an electrolytic oxidation film has formed. The niobium powder and the binder are mixed and kneaded together, and mixed-kneaded niobium powder is thus prepared. Along with a metal wire made of tantalum with a diameter of 0.5 mm that later serves as the anode lead, the niobium powder mixed and kneaded with the binder is formed into a shape with a size of 4.5 mm×3.3 mm×1.1 mm by use of the mold. (Four) holes (with 0.5 mmf) which penetrate the niobium-powder molded body are opened in the niobium-powder molded body by use of the piercing jig, as shown in FIG. 3. Thereafter, by use of another piercing jig, (two) through-holes (with 0.5 mmf) penetrating anode body 3 between the two surfaces of the molded body which are different from the two surfaces between which the (four) through-holes penetrate anode body 3 are opened in a way that the (two) newly-formed through-holes should not cross the wire that will become the anode lead. Subsequently, the binder is removed from the resultant niobium-powder molded body under reduced pressure. The resultant niobium-powder molded body is sintered at 1100° C. Thereby, anode body 3 made of niobium, as well as inclusive of the through-holes which penetrate anode body 3 in one direction, and the through-holes which penetrate anode body 3 in the other direction, is formed.

Subsequently, the solid electrolytic capacitor according to example 2 is completed in the same manner as the solid electrolytic capacitor according to example 1 is completed.

In addition, the capacitance of anode body 3 according to example 2 immersed in water and the average capacitance of 100 solid electrolytic capacitors according to example 2 are measured as in the case of anode body 3 and the 100 solid electrolytic capacitors according to example 1.

Comparative Example

Niobium powder having a CV value which is equal to 100,000 [µF·V/g] is used as the material for anode body 3.

The CV value is the product of capacitance and electrolytic voltage of a niobium sintered body on which an electrolytic oxidation film has formed. The niobium powder and the binder are mixed and kneaded together, and mixed-kneaded niobium powder is thus prepared. Along with a metal wire made of tantalum with a diameter of 0.5 mm, which later serves as the anode lead, the niobium powder mixed and kneaded with the binder is formed into a shape with a size of 4.5 mm×3.3 mm×0.95 mm by molding. Subsequently, the binder is removed from the niobium-powder molded body under reduced pressure. The resultant niobium-powder molded body is sintered at 1100° C. As a result, anode body 3 made of niobium is formed.

Subsequently, the solid electrolytic capacitor according to the comparative example is completed in the same manner as the solid electrolytic capacitor according to example 1 is completed.

In addition, the capacitance of anode body 3 according to the comparative example immersed in water and the average capacitance of 100 solid electrolytic capacitors according to comparative example are measured as in the case of anode body 3 and the 100 solid electrolytic capacitors according to example 1.

Evaluation 1

For each of examples 1 to 2 and the comparative example, the capacitances of the respective 100 solid electrolytic capacitors are measured, and an average value obtained as an average capacitance. Subsequently, from the average capacitance values thus obtained, the relative capacitance of the solid electrolytic capacitors according to example 1 and the relative capacitance of the solid electrolytic capacitors according to example 2 are obtained by assigning "1" to the average capacitance of the solid electrolytic capacitors according to the comparative example. In addition, for each of examples 1 to 2 and the comparative example, the ratio of average capacitance obtained after the solid electrolytic capacitors are manufactured to the capacitance of anode body 3 immersed in water after dielectric layer 4 is formed is obtained as an incidence rate (%) of the capacitance. These results are shown together in Table 1. In this respect, the sizes respectively of anode bodies 3 according to examples 1 to 2 and comparative example are adjusted to make capacitances respectively of anode bodies 3 according to examples 1 to 2 and comparative example immersed in water equal to one another.

TABLE 1

| | AVERAGE CAPACITANCE $C_M$ (µF) | RELATIVE CAPACITANCE INDEX (RELATIVE TO COMPARATIVE EXAMPLE) | CAPACITANCE OF ANODE BODY IMMERSED IN WATER $C_A$ (µF) | INCIDENCE RATE OF CAPACITANCE $(C_M/C_A)$ (%) |
|---|---|---|---|---|
| EXAMPLE 1 | 343 | 1.41 | 420 | 82 |
| EXAMPLE 2 | 362 | 1.49 | 420 | 86 |
| COMPARATIVE EXAMPLE | 243 | 1.00 | 420 | 58 |

As seen in Table 1, the average capacitance (343 µF) of example 1 is larger than the average capacitance (243 µF) of comparative example by 41%. The incidence rate of capacitance of example 1, which is 82%, is larger than the incidence rate of capacitance of the comparative example, which is 58%. In addition, the average capacitance of example 2 is larger than that of comparative example by 49% and the incidence rate of capacitance of example 2, which is 86%, is larger than that of example 1. One considered reason for these is that a larger number of through-holes in example 1 than in the comparative example causes the conducting polymer (for example, polypyrrole), which is the solid electrolytic film, to form deeper inside of anode body in example 1 than in the comparative example.

Evaluation 2

The impact resistance of each of the solid electrolytic capacitors according to example 1 to 2 and comparative example is tested. More specifically, each of examples 1 to 2 and the comparative example, are packaged as 20 sample solid electrolytic capacitors on a printed circuit board by non-lead soldering. The 20 sample solid electrolytic capacitors thus packaged are dropped onto a concrete floor from a height of 1.5 m with a 100-gram load added to the sample capacitors, and with the board facing toward the concrete floor, twenty times. For each of examples 1 to 2 and the comparative example, the capacitor characteristics are evaluated after the drop test. For each of examples 1 to 2 and the comparative example, sample capacitors whose post-tested capacitance values are smaller than their pre-tested capacitance values by 20% or more are regarded as defective, and the number of defective sample capacitors is counted.

As a result, out of the 20 sample capacitors according to the comparative example, 8 sample capacitors are defective. By contrast, out of the 20 sample capacitors according to each of examples 1 to 2, no sample capacitor is defective.

As a reason for these, it can be pointed out that the adhesion between the molded resin and the cathode layer formed on the surface of the anode body is enhanced in the 20 sample capacitors according to each of examples 1 to 2. One may consider that the adaptation of the structure which makes the through-holes penetrate the anode body causes the resin to enter the anode body via the through-holes during molding, and that the resin in the anode body thus holds the anode body more firmly so that adhesion between the resin and the cathode layer increases, and mechanical strength of the solid electrolytic capacitors according to each of examples 1 to 2 accordingly increases.

As described above, the present embodiments are capable of providing more reliable solid electrolytic capacitors with higher capacitance than ever and methods of manufacturing the solid electrolytic capacitors. As a result, solid electrolytic capacitors according to the present embodiments are applicable to not only various electronic appliances including personal computers and imaging apparatuses, but also power supply circuits for portable appliances typical of cellular phones, portable music players and the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A solid electrolytic capacitor comprising:
   an anode body including a porous body;
   a dielectric layer formed on the anode body;
   an conducting polymer layer formed on the dielectric layer,
   wherein the anode body includes at least one hole which penetrates the anode body from the first surface to a second surface,
   and
   an outer package that covers at least part of the conducting polymer layer, wherein part of the outer package enters the hole.

2. The solid electrolytic capacitor of claim 1, wherein part of the outer package in the first-surface side and another part thereof in the second-surface side connect to each other inside the hole.

3. The solid electrolytic capacitor of claim 1,
   wherein the hole is circular with a diameter between 0.1 mm and 1 mm.

4. The solid electrolytic capacitor of claim 1,
   wherein the hole is circular with a diameter between 0.3 mm and 0.7 mm.

5. The solid electrolytic capacitor of claim 1,
   wherein the first and second surfaces of the anode body are positioned in opposite to each other.

6. The solid electrolytic capacitor of claim 1,
   wherein the porous body comprises sintered particles of a valve metal.

7. The solid electrolytic capacitor of claim 6, wherein the valve metal is niobium.

8. A method of manufacturing a solid electrolytic capacitor, comprising:
   forming an anode body, comprising
   mixing and kneading particles of a valve metal and a binder to form a mixture;
   molding the formed mixture into a body;
   forming a through-hole in the molded body;
   sintering the molded body in which the through-hole has formed;
   forming a dielectric layer on a surface of the anode body; and
   forming a conducting polymer layer on the dielectric layer that extends out both openings of the through-hole, and
   forming an outer package that covers at least part of the conducting polymer layer, wherein part of the outer package enters the hole.

9. The method of claim 8,
   wherein part of the outer package is formed in the first-surface side and another part thereof in the second-surface side connect to each other inside the hole.

10. The method of claim 8,
    wherein the hole is circular with a diameter between 0.1 mm and 1 mm.

11. The method of claim 8,
    wherein the hole is circular with a diameter between 0.3 mm and 0.7 mm.

12. The method of claim 8,
    wherein the first and second surfaces of the anode body are positioned in opposite to each other.

13. The method of claim 8,
    wherein the porous body comprises sintered particles of a valve metal.

14. The method of claim 13, wherein the valve metal is niobium.

* * * * *